Sept. 13, 1955  L. H. FLORA  2,717,749
INSTRUMENT MOUNTING AND FASTENER THEREFOR
Filed Nov. 17, 1952
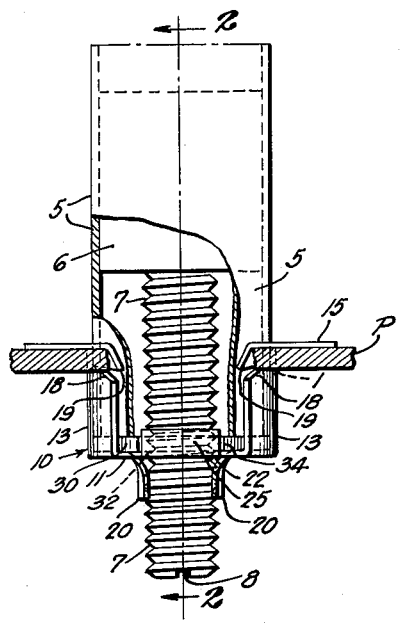
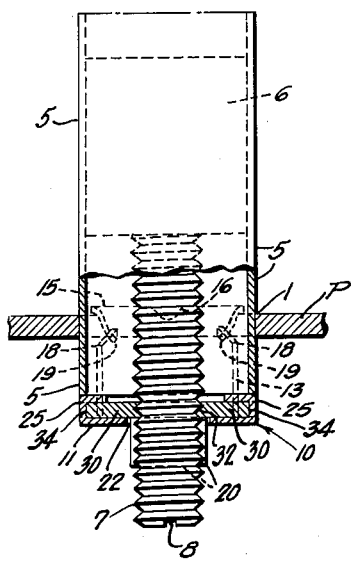
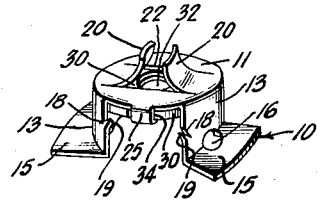
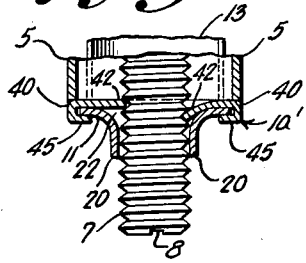
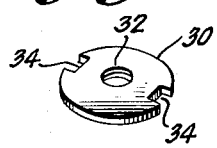
INVENTOR
LAURENCE H. FLORA
BY
ATTORNEY

United States Patent Office 2,717,749
Patented Sept. 13, 1955

2,717,749

INSTRUMENT MOUNTING AND FASTENER THEREFOR

Laurence H. Flora, Cleveland, Ohio, assignor to Tinnerman Products, Inc., Cleveland, Ohio, a corporation of Ohio Application November 17, 1952, Serial No. 321,020

3 Claims. (Cl. 248—27)

This invention relates, in general, to fasteners for instrument mountings, and the like, and deals, more particularly, with such fasteners in the form of sheet metal clips for securing an adjustable screw threaded member of an instrument in generally normal relation to a supporting plate or panel in operative association with a cooperating instrument member.

The improved fasteners of the invention are provided in the form of a simplified sheet metal clip construction for mounting instruments such as tuning elements, or like control units in radio and television constructions or other electronic apparatus wherein the instruments comprise a tubular casing or similar body such as a coil form, for example, that is secured in generally normal relation to a supporting plate or panel together with an adjustable screw threaded member carrying an adjustable tuning core within the coil form.

Usually such a screw threaded member of the instrument is suitably supported in an aperture in the fastener base defining an integral thread opening for threadedly engaging the screw thread together with integral tongue elements, or the like, having a friction or binding action on the crests of the thread convolutions to hold the screw in any selected position of adjustment. However, in many instances, particularly where relatively small size fasteners are necessary or desirable, such thread engaging means must be formed in a corresponding small size which, of course, lack the strength, rigidity and durability that is required for best results.

A primary object of this invention, therefore, is to provide a fastener of this character for an instrument mounting or the like, such as described, in which the fastener is provided in the form of a sheet metal clip having a separate nut member, or the like, connected to the base of the clip to provide a substantial means for threadedly engaging the adjustable screw threaded member of the instrument in a stronger, more rigid and durable threaded connection which is adapted to withstand constant usage and frequent handling in a long and extended period of satisfactory service.

A further object of the invention is to provide such a fastener for an instrument mounting, or the like, in which the fastener is provided as a sheet metal clip having means for connecting the separate nut member thereto in a unitary construction.

Another object of the invention is to provide a fastener of the kind described for an instrument mounting or the like, in which the fastener is provided as a sheet metal clip and the separate nut member comprises a nut plate or the like having means for connecting the nut to the clip in a unitary construction.

A further object of the invention is to provide various forms of fasteners in accordance with the foregoing which are inexpensive, easily and quickly applied, and readily secured on supporting plates or panels of different thickness, and which, when installed, are strong, durable and reliable and not subject to loosening, wobbling or displacement from applied position.

Further objects and advantages and other new and useful features in the construction arrangement and general combination of elements in the improved fasteners of the invention will be readily apparent as the following description proceeds with reference to the accompanying drawings in which like reference characters designate like parts throughout, and in which:

Fig. 1 is a front elevational view, partly in section, of a completed instrument mounting in accordance with the invention in which the fastener is shown in edge elevation and the associated supporting plate or panel and instrument body shown partly in section;

Fig. 2 is a side elevational view of the completed instrument mounting shown partly in section, as along line 2—2 of Fig. 1, looking in the direction of the arrows;

Fig. 3 is a perspective view of the fastener per se shown in Figs. 1 and 2; and, Fig. 4 is a perspective view of the separate nut member or nut plate included in the fastener shown in Figs. 1–3, inclusive.

Fig. 5 is a perspective view of an alternate form of separate nut member or nut plate which is used in another fastener construction in accordance with the invention as shown in Fig. 6; and, Fig. 6 is a fragmentary vertical sectional view illustrating the construction of the screw engaging portions in another form of fastener in accordance with the invention embodying the separate nut member or nut plate shown in Fig. 5.

Referring now, more particularly, to the drawings, there is shown in Figs. 1 and 2 the general organization involved in the mounting of an instrument such as a tuning unit which is secured on a supporting plate or panel P, such as the base panel of a radio or television chassis, for example. The tuning unit comprises a generally tubular shaped member 5 such as a tube, sleeve or cylinder, or the like, which is constructed of any suitable material such as cardboard, composition material, plastic, etc., to serve as a tubular coil form or equivalent body for any related type of instrument to be mounted on the supporting plate or panel P. The coil tube 5 is intended to be fixedly and rigidly mounted in a socket opening 1 in the supporting panel P and such socket opening, accordingly, is of a size approximating the combined diameter of the tube 5 in assembled relation with the clip.

In the present example, the tuning unit is shown as including an inner core element 6 which is axially movable within the hollow body of coil tube 5 by an adjusting screw 7 which extends through the panel opening 1 and is adjustably supported in the assembly by thread engaging means on the fastener base 11, as presently to be described. The adjusting screw 7 is thereby capable of rotation for any desired fine or minute adjustment, as by a tool applied to the tool recess 8 provided in the free end of said screw, for example.

The fastener, designated generally 10, is a relatively simple and inexpensive article of manufacture in that it may be most economically constructed from a comparatively small section of any suitable sheet metal, preferably of a spring metal nature, such as spring steel or cold rolled steel having spring-like characteristics. The fastener may be formed from sheet metal blanks of various outlines, but from the standpoint of most economical production is best provided from a generally rectangular blank obtained from standard sheet metal strip stock with little loss or waste of material. As shown in Fig. 3, a blank or stamping of such character is bent into the form of a generally U-shaped fastener comprising a base 11 intermediate a pair of cooperating arms or body portions 13 which are bent transversely into a generally arcuate configuration corresponding to the cylindrical contour of the coil tube 5 or other body in order to engage the same firmly and rigidly on opposite faces thereof.

The free ends of said arms 13 are bent outwardly in opposite directions to define flanges 15. Preferably such flanges 15 are bent downwardly slightly below the horizontal in normal untensioned relation in order to be yieldable in the manner of yieldable head portions so that the fastener is adapted for securing engagement with supports of various thicknesses, within limits, and to compensate for possible irregularities and manufacturing variations in the thickness of the support P adjacent the socket opening 1 therein. As illustrated in Fig. 3, a perforation 16 preferably is provided at the junction of each flange 15 with the adjacent arcuate arm portion 13 in order to facilitate bending in the manner shown.

Along the edges of the arms or body portions 13 of the fastener, diagonal slits are provided in a predetermined spacing from the flanges 15 approximating the thickness of the plate or panel P on which the fastener is to be secured. These diagonal slits each define inclined cam shoulders 18 and complementarily shaped prongs 19 both formed at the same time in an inexpensive and highly practical manner. The prongs 19 are bent inwardly in a manner to define inwardly extending barbs adapted to dig into and become embedded in the coil tube 5 when said tube is assembled within the arcuate arms 13 of the clip. The edge portions adjoining the cam shoulders 18 are preferably bent slightly outwardly in the manner of wings to position said inclined cam shoulders 18 in an effective position for snap fastening engagement with the adjacent lower corner edges of the socket opening 1 in the supporting panel P.

In this relation, the adjustable core 6, which is telescopically received within the coil tube 5, is adjustably supported in the assembly by means of the adjusting screw 7 threadedly engaged with thread engaging means provided by a separate nut or nut plate 30 connected to the base 11 of the fastener in cooperation with integral tongue elements 20 adapted for tensioned, frictional engagement with the crests of the thread convolutions of said adjusting screw 7 to prevent displacement or loosening thereof from any desired setting or adjusted relation of the tuning core 6 within the coil form or tubular body 5. In a preferred construction, a substantially diametric strip portion of the base 11 of the fastener is slit and stamped therefrom to provide a pair of opposing yieldable tongues 20 which are bent outwardly out of the plane of said base 11 for engaging the crests of the thread convolutions of said adjusting screw 7 under tension, while the space in the fastener base 11 from which said tongues are provided defines an enlarged passage 22 for said adjusting screw 7. Said tongue elements 20 preferably are bent transversely in an arcuate form to define cooperating curved surfaces adapted to engage relatively wide portions of the crests of the thread convolutions on said adjusting screw 7 to effect a pronounced frictional drag thereon.

A pair of integral fingers or hooks 25 are provided on the base 11 of the fastener in the spaces between the arms 13. These fingers are formed as initially straight strips which are bent over the nut or nut plate 30 in the manner of hooks to connect said nut plate 30 to the base 11 of the fastener.

The nut or nut plate 30, Fig. 4, is a simple circular disc having a tapped thread opening 32. Preferably, the nut plate 30 is provided on its edges with diametrically opposed radial slots or notches 34 into which the bent over fingers 25 are received to connect said nut plate 30 rigidly to the fastener base 11 against relative rotation or displacement. In the present example, the nut plate 30 is shown as made of a thickness of metal of such gauge that the thread opening 32 therein defines a plurality of thread convolutions for threadedly engaging the screw threaded instrument member 7 in the usual manner of a nut. The thread opening or thread portion 32 may be provided on the nut plate 30 in any other suitable construction, and, in this relation the present invention fully contemplates the provision of such a thread portion in the form of a tubular hub which is pressed from a relatively thin plate 30 and has the wall thereof tapped to provide a plurality of thread convolutions. Likewise, such a thread portion may be provided by an opening which includes cooperating tongues or a helical edge, or the like, as shown in Fig. 5, for example, for threadedly engaging the screw threaded member 7 in the manner of a nut.

The nut plate 30, as thus provided with a suitable thread opening or thread portion 32, is connected to the fastener base 11 by the bent over fingers 25, as shown in Figs. 1–3, inclusive, with said thread opening 32 in the nut in registration with the enlarged passage 22 in the fastener base 11 and in alignment with the friction tongues 20 projecting outwardly from said fastener base 11.

In the assembled relation of the adjusting screw 7 with the completed fastener 10, the nut portion 32 of the nut plate 30 threadedly engages the adjusting screw 7 in cooperation with said tongues 20 frictionally and grippingly engaging the crests of adjacent convolutions of the thread on said adjusting screw 7. There is thus provided an exceptional thread locking action on the adjusting screw 7 as a result of the combined drag exerted on the screw thread by the nut portion 32 together with the pronounced, frictional gripping action of the tensioned friction tongues 20 with the crests of the thread convolutions adjacent said nut portion 32. Said friction tongues 20, otherwise, serve to bolster and maintain the adjusting screw 7 in substantially perpendicular relation to the base 11 of the fastener in the threaded engagement thereof with the nut portion 32 such that looseness or play in the adjusting screw 7 is minimized and practically eliminated even after an extended period of use. Accordingly, the arrangement is such that the adjusting screw 7 is held by a frictional thread locking action in any adjusted position against accidental turning or unintended rotation which otherwise would disturb the proper setting of said screw 7. However, even though the adjusting screw 7 is thus retained under the various friction forces on the thread thereof, said screw is capable of fine, minute adjustments by means of a tool applied to the recess 8 to turn the same as required in providing any necessary or desired relation of the core 6 within the body of the coil tube 5.

In use, it will be understood that with the various parts of the instrument mounting provided substantially as described, the clip 10 and the adjustable core 6 are assembled by threading the adjusting screw 7 into threaded engagement with the nut portion 32 on the base 11 of the fastener and into frictional contact with the friction tongues 20. The coil tube or coil form 5 is then telescoped over the tuning core 6 and the lower end thereof forced between the arcuately shaped arms or body portions 13 of the clip in a friction, press fit in which the leading edge of the tube seats on the outer edges of the nut plate 30 and the prongs 19 dig into and become embedded in adjacent surfaces of said tube 5 to anchor the same in such assembled position with the clip. The prongs 19 are formed to extend inwardly and downwardly so as to permit movement of the tube 5 to the aforesaid assembled position in one direction but prevent reverse movement of said tube 5 in the opposite direction toward disassociation from the arms 13 of the clip.

Although the core member 6 may be assembled in a similar manner after the coil tube 5 is mounted onto the supporting panel, the foregoing procedure is preferable in that all the parts of the instrument are assembled and ready for the final step in mounting the unit on the panel in a simple and speedy procedure, which, of course, is most important in mass production methods in that the complete units may be prepared in quantities ready for quick and easy installation in a minimum of time and effort as is necessary on an assembly line, for example.

With the instrument unit thus assembled, the same is easily and quickly mounted on the supporting plate or panel P by inserting the base 11 and the adjacent lower securing portions of the arms 13 of the clip through the socket opening 1 in a manner whereby the leading edges of the outwardly bent wings carrying the inclined cam shoulders 18 serve as substantial guide surfaces which cam the side walls of the socket opening 1 with progressively increasing force. This causes a gradual compression of said wings inwardly as necessary to permit passage thereof through said socket opening 1 to a position in which the inclined cam shoulders 18 on said wings snap into engagement with the lower corner edges of said socket opening 1 and the adjacent marginal portions at the underface of the panel P, substantially as shown in Figs. 1 and 2. In this position, the flanges 15 bear upon the opposite face of the panel P to cooperate with said cam shoulders 18 in engaging opposite sides of said panel to retain the instrument in firm, rigid, fixedly mounted position thereon.

If desired, a substantially positive locked mounting may be provided by forming the shoulders 18 in a more pronounced configuration to engage material portions of the panel adjacent the socket opening 1 in substantial abutting engagement therewith so that there is little or no possibility of displacement or accidental removal of the mounting. However, the provision of said shoulders 18 in the manner of inclined or tapered substantial cam surfaces, as shown, is more advantageous in certain respects in that the use of a certain size fastener with supporting panels of several thicknesses is possible. Also, a positive, self-seating of the fastener in rigid mounted position is ensured by reason of the expansive action supplied by the inherent resiliency of the wings adjoining the cam shoulders 18 to urge said cam shoulders outwardly in a manner to cause the same to ride automatically on the lower corner edges of the socket opening 1 to the point of most effective locked fastening engagement therewith substantially as shown in Figs. 1 and 2. It is also to be appreciated that the spring flanges 15 preferably are bent slightly downwardly in normal untensioned relation and are thereby effective to cause said cam shoulders 18 to compensate for slight clearances and other manufacturing variations in the size of the socket opening 1 and the adjacent thickness of the plate or panel P.

In the event that removal of the mounting is desired, this may be accomplished simply by exerting suitable force on the arms or body portions 13 to urge the same inwardly as necessary for the shoulders 18 thereon to clear the socket opening 1 as the unit is pushed in an axial direction opposite to that in which the same was applied to mounted position, whereupon the several parts of the assembly may be disassociated in a reversal of the procedure described for assembling the unit.

Fig. 6 illustrates another fastener construction 10′ in accordance with the invention which is generally similar to that described with reference to Figs. 1–3, inclusive, and includes an alternate arrangement for attaching the nut or nut plate 40, Fig. 5, on the fastener base 11 between the arms 13 thereof. The nut plate 40, in this instance, may be made as a simple sheet metal stamping comprising a circular disc having a central nut portion 42 provided by a keyhole-shaped aperture therein. The edges of such a keyhole-shaped aperture are depressed to the underside of said disc 40 to define a helical thread corresponding to the helix of the thread on the screw threaded member 7 for threadedly engaging any convolution of said thread, with said thread passing through the radial slot of said keyhole-shaped aperture 42.

The nut plate 40 carries a pair of integral fingers 45 at opposite sides thereof. The nut plate 40 is assembled onto the base 11 of the clip between the arms 13 thereof with said fingers 45 positioned in the spaces between said arms 13, and said fingers 45 are thereupon bent over the edges of said base 11 in the manner of hooks to connect said nut plate 40 to said base 11 of the fastener substantially as shown in Fig. 6. The nut plate 40 is thus attached fixedly and rigidly to the fastener base 11 against relative turning with the nut portion 42 thereof in registration with the enlarged passage 22 in the fastener base and in line with the friction tongues 20 projecting outwardly from said fastener base 11.

The completed fastener 10′, otherwise, is generally similar in construction to that of Figs. 1–3, inclusive, and has the same general application and use for mounting an instrument comprising a tubular coil form 5 or other body secured between the arms 13 of the fastener together with an adjustable screw threaded member 7 telescoped within said tubular coil form 5 in threaded engagement with said nut portion 42 of the nut plate 40 at the inner side of the fastener base 11 and frictionally and grippingly engaged by the friction tongues 20 at the outer side of said fastener base 11.

It will be appreciated that both forms of fasteners in accordance with the invention have the same general construction comprising a separate nut member attached to the fastener base 11 by suitable means such as the fingers 25 on the fastener base connected to the nut plate 30 as in Figs. 1–3, inclusive, or in the manner of the equivalent construction of Figs. 5 and 6 in which the nut plate 40 carries the similar fingers 45 connected to the fastener base 11. Likewise, any other suitable means may be provided on either the fastener base 11 or the separate nut or nut plate for connecting the same together, as and for the purposes described. And while the aforesaid general construction of the fasteners with a separate nut member or nut plate is disclosed in connection with clips having securing means in the form of cam shoulders 18 on the edges of the arms 13 thereof, the invention fully contemplates the provision of the fasteners with any other suitable securing means such as elements projecting from the fastener base 11 between the arms 13 or stamped from intermediate portions of said arms 13 and formed or bent to define similar or equivalent shoulders adapted to secure the fastener in a socket opening in a plate or panel or other support.

In any form, the clip member of the fastener preferably is constructed of relatively thin sheet metal, the thickness of which is selected according to service requirements and the predetermined size of the members of the instrument. The fasteners are most effective when provided of spring metal suitably treated to give the desired toughness or hardness. A cheap but effective fastener may also be provided from cold rolled metal which is untempered but of a spring metal nature and preferably harder than the metal of the adjusting screw 7 in order that the integral friction tongues 20 will not be subject to any degree of wear which would affect the precise and exact operative arrangement of the respective parts or members of the instrument mounting.

While the invention has been described in detail with specific examples, such examples are intended as illustrations only, inasmuch as it will be apparent that there are numerous possible modifications and variations in the construction, arrangement and general combination of elements and details of the fasteners shown in the present disclosure which fall within the spirit and scope of the invention.

What is claimed is:

1. In an instrument mounting, a fastener for mounting a relatively small size tubular coil form in an opening in a support together with an adjustable core in said coil form having a relatively small size adjusting screw projecting from the inner end of said core, said fastener comprising a piece of sheet metal bent to provide a base having a passage for said adjusting screw and a pair of spaced arms bent upwardly from the ends of said base and receivable in secured relation in said opening in the support with said coil form secured between said spaced arms of the fastener, a separate disk-like nut member positioned on the inner surface of said base of the fastener between said spaced arms thereof and having a threaded opening in line with said passage in said base for threadedly engaging said adjusting screw, means at the sides of said base in the space between spaced arms comprising fingers connecting said separate nut member on the inner surface of said base; and a pair of integral spaced tongues on said base projecting outwardly from the outer surface of said base in line with the passage in said base and said threaded opening in said nut member, said tongues being adapted for frictionally engaging the crests of the thread convolutions on said adjusting screw in cooperation with the threaded portion of said nut member in threaded engagement with said thread convolutions on said adjusting screw.

2. In an instrument mounting, a fastener for mounting a relatively small size tubular coil form in an opening in a support together with an adjustable core in said coil form having a relatively small size adjusting screw projecting from the inner end of said core, said fastener comprising a piece of sheet metal bent to provide a base having a passage for said adjusting screw and a pair of spaced arms bent upwardly from the ends of said base and receivable in secured relation in said opening in the support with said coil form secured between said spaced arms of the fastener, a separate disk-like nut member positioned on the inner surface of said base of the fastener between said spaced arms thereof and having a threaded opening in line with said passage in said base for threadedly engaging said adjusting screw, a pair of integral fingers extending inwardly from the sides of said base in the space between said spaced arms and engaging said separate nut member to connect said nut member on the inner surface of said base, and a pair of integral spaced tongues on said base projecting outwardly from the outer surface of said base in line with the passage in said base and the threaded opening in said nut member, said tongues being adapted for frictionally engaging the crests of the thread convolutions on said adjusting screw in cooperation with the threaded portion of said nut member in threaded engagement with said thread convolutions on said adjusting screw.

3. In an instrument mounting, a fastener for mounting a relatively small size tubular coil form in an opening in a support together with an adjustable core in said coil form having a relatively small size adjusting screw projecting from the inner end of said core, said fastener comprising a piece of sheet metal bent to provide a base having a passage for said adjusting screw and a pair of spaced arms bent upwardly from the ends of said base and receivable in secured relation in said opening in the support with said coil form secured between said spaced arms of the fastener, a separate disk-like nut member positioned on the inner surface of said base of the fastener between said spaced arms thereof and having a threaded opening in line with said passage in said base for threadedly engaging said adjusting screw, a pair of spaced fingers extending from said nut member outwardly over the sides of said base in the space between said spaced arms and engaging the outer surface of said base to connect said separate nut member to the inner surface of said base, and a pair of integral spaced tongues on said base projecting outwardly from the outer surface of said base in line with the passage in said base and the threaded opening in said nut member, said tongues being adapted for frictionally engaging the crests of the thread convolutions of said adjusting screw in cooperation with the threaded portion of said nut member in threaded engagement with said thread convolutions on said adjusting screw.

References Cited in the file of this patent

UNITED STATES PATENTS

| Number | Name | Date |
|---|---|---|
| 741,905 | Ham | Oct. 20, 1903 |
| 1,046,914 | Webb | Dec. 10, 1912 |
| 1,800,176 | Carr | Apr. 7, 1931 |
| 2,108,975 | Sorensen | Feb. 22, 1938 |
| 2,335,464 | Tinnerman | Nov. 30, 1943 |
| 2,376,167 | Mitchell | May 15, 1945 |
| 2,539,172 | Andrews | Jan. 23, 1951 |